Figure 1:
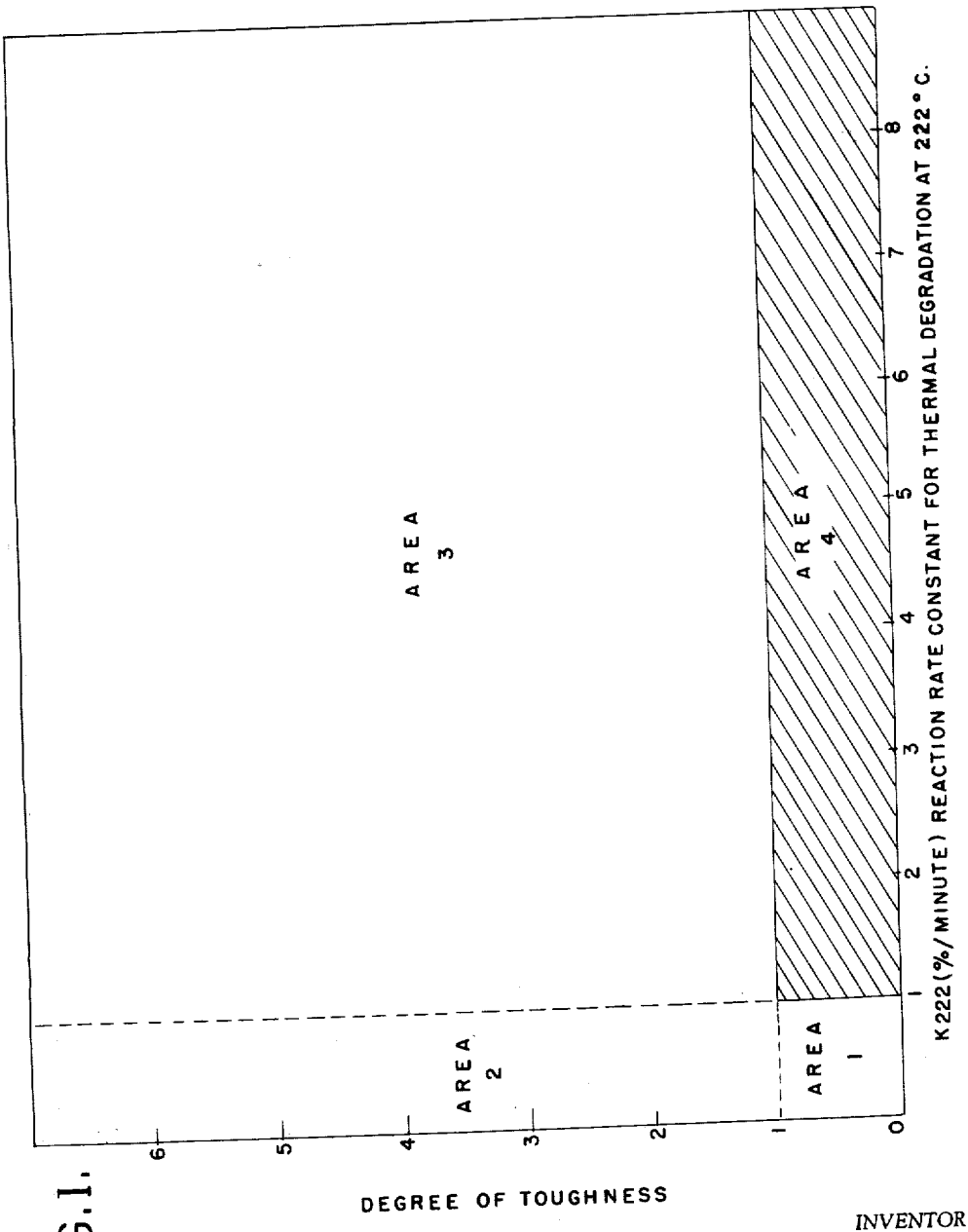

Oct. 30, 1956 R. N. MacDONALD 2,768,994
POLYOXYMETHYLENES
Filed Feb. 4, 1954 2 Sheets-Sheet 1

INVENTOR
Robert Neal MacDonald
BY
ATTORNEY

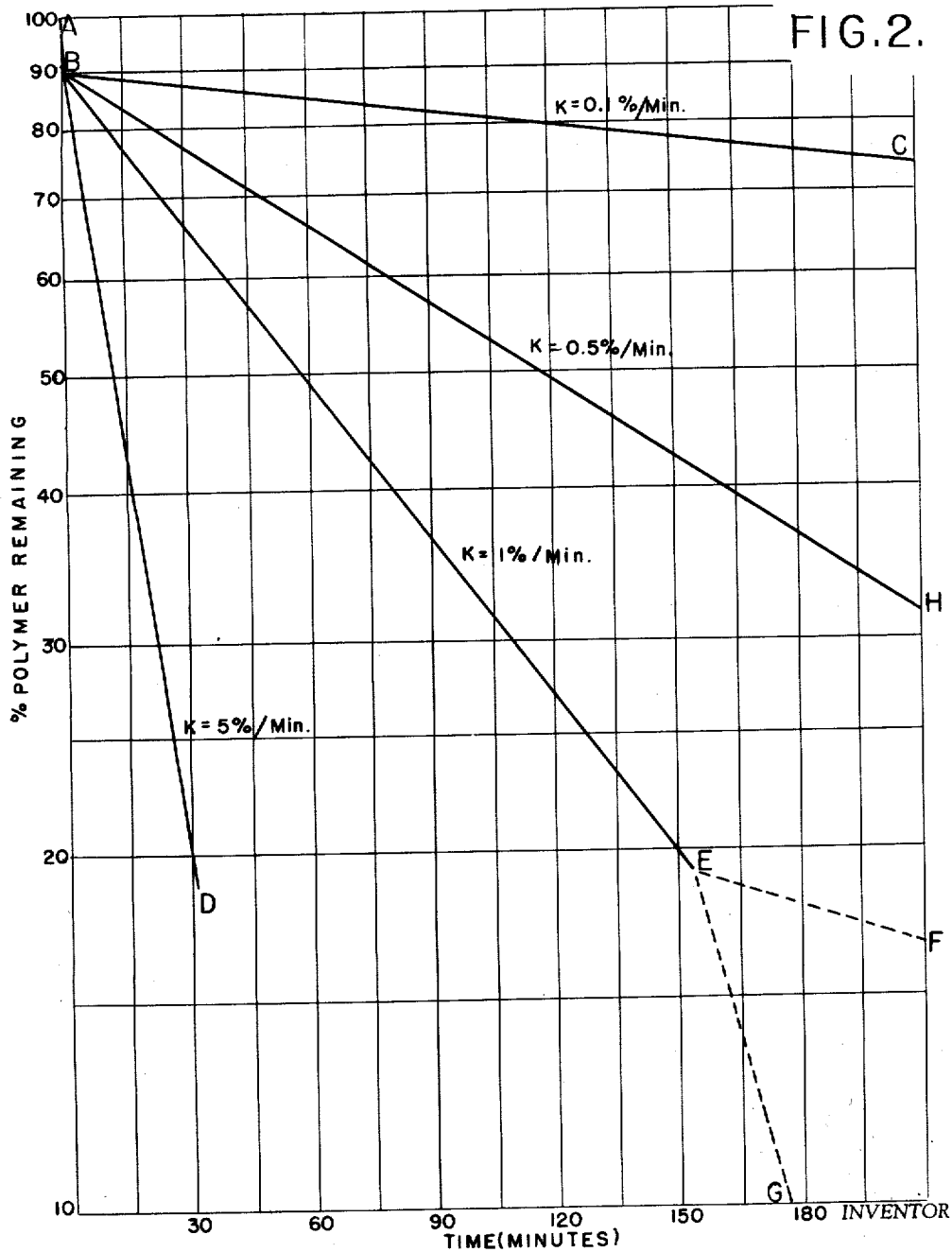

United States Patent Office 2,768,994
Patented Oct. 30, 1956

2,768,994

POLYOXYMETHYLENES

Robert Neal MacDonald, Wilmington, Del., assignor to E. I. du Pont de Nemours and Company, Wilmington, Del., a corporation of Delaware Application February 4, 1954, Serial No. 408,172

11 Claims. (Cl. 260—67)

This invention relates to high molecular weight polyoxymethylenes and to their preparation.

This is a continuation-in-part of copending application Serial No. 365,233, filed by R. N. MacDonald on June 30, 1953, which in turn is a continuation-in-part of copending application Serial No. 307,362, filed by R. N. MacDonald on August 30, 1952, both of which are now abandoned.

It has been known in the past that formaldehyde could be polymerized to various qualities of product. Such methods and products are described by H. Staudinger in "Die Hochmolekularen Organischen Verbindungen," Julius Springer, Berlin, 1932, and by Walker in "Formaldehyde," Reinhold Publishing Corp., New York, 1944. The methods described in the foregoing books are classed, in present day terminology, either as "bulk" or "solution" polymerizations. The products are called EU-polyoxymethylenes by both Staudinger and Walker. The "bulk" polymerization method entails condensing anhydrous, gaseous formaldehyde to a liquid and maintaining the liquid at about −80° C. until polymerization is complete. The "bulk" polymerization product is a solid block of polymeric formaldehyde. In the "solution" method, monomeric formaldehyde is dissolved in an unagitated liquid, such as ether, which is an excellent solvent for the monomer at about −80° C. Thereafter the solution is allowed to warm to room temperature. A catalyst may or may not be utilized in the "solution" method to initiate polymerization, said catalysts being, for example, boron trichloride or trimethylamine. The product of the "solution" polymerization is a powdery or granular type of substance.

"Bulk" polymer made by Staudinger's method is unstable to the action of heat. Films may be pressed from some batches of "bulk" polymer, but only with an accompanying degradation of a large amount of the polymer. Furthermore, the film which is formed is tough initially, but this property rapidly disappears when the film is aged in air at 105° C., or is allowed to stand at room temperature for a long period of time.

EU-polyoxymethylene made by the solution method in ether is reported by Staudinger to be inferior to "bulk" polymer in its plastic-elastic properties.

It is known that the methods described in the prior art produce formaldehyde polymers which are so unstable that they have never been considered to be suitable for conversion to molded articles, fibers, films, bristles, and other articles commonly made from synthetic plastics. Many of these prior art formaldehyde polymers appears to be attractive when first prepared, but upon aging or standing, they degrade, become brittle, and develop other undesirable properties. The process of this invention has been found to produce high molecular weight polyoxymethylenes which, in contradistinction to those of the prior art, can be made into articles having excellent physical properties. Molding, spinning and forming techniques of today degrade the prior art polymers to such an extent that the fabricated article contains internal bubbles, splay marks, and the like, due to release of degradation vapors, and consequently the only commercial use of the prior art polymers is to provide a source of formaldehyde monomer. On the other hand the compositions of this invention can be molded, drawn, spun, or formed into articles by conventional methods without serious degradation and without the formation of splay marks or internal bubbles, and furthermore the articles which are produced from the polymers of the present invention retain their good qualities of toughness, stiffness, homogeneity, and appearance.

It is not fully understood why the processes of this invention accomplish results so strikingly different from the prior art. However, although it is not intended that this invention be bound by the explanation, it is believed that the method of introducing the monomer into a reaction medium, whereby the monomer is polymerized as fast as it contacts the reaction medium, may effect some purification of the monomer, of the reaction medium, or of both. There may also be such a small amount of formaldehyde monomer present at any one time that the many well known reactions of formaldehyde do not take place to any appreciable extent, with the result that the present processes produce longer and stronger chains of recurring ($CH_2O$) units with less foreign, and possibly weak, elements in the chain. In contrast to the present invention, the prior art workers introduced formaldehyde into a reaction chamber at about −80° C., sealed the chamber and then allowed polymerization to occur, sometimes over a period of days and at times with explosive rapidity. It may be that the above prior art processes introduced so many weak elements into the polymer that degradative reactions occurred at these weak points, destroying the polymer. Whatever may be the reason, or reasons, for the success of this invention, it has been found that when substantially anhydrous formaldehyde monomer is introduced in a continuous fashion into a reaction medium which is chemically inert to formaldehyde, and the reaction conditions are such as to cause polymerization to occur at a controllable rate, comparable to that rate at which the monomer is introduced, there is formed a dispersion of a high molecular weight addition polymer of formaldehyde which can be formed into articles having excellent physical properties.

It is an object of this invention to provide novel compositions of matter. It is another object of this invention to provide commercially attractive high molecular weight polyoxymethylenes, and methods for preparing such polymers. It is still another object of this invention to provide new high molecular weight polyoxymethylenes having the ability to retain toughness after thermal aging. Another object of this invention is to provide high molecular weight polyoxymethylenes having an excellent thermal stability, and to provide methods for the production of such polymers. Other objects and advantages of this invention will be apparent from the following examples and description.

The formaldehyde polymers of this invention are obtained by continuously passing gaseous, substantially anhydrous, monomeric formaldehyde into a reaction zone containing a reaction medium which is inert to formaldehyde under the conditions of reaction, and permitting the formaldehyde to polymerize continuously as the monomer is introduced.

The polymers of this invention are defined as either having a minimum of toughness retention, defined as a "degree of toughness" of at least 1, or having a minimum thermal stability, defined as a reaction rate constant for thermal degradation at 222° C. of less than 1% by weight of the polymer per minute.

Figure 1 is a schematic representation of the polymers of this invention. Figure 1 is a graph in which increasing values of degree of toughness are measured along the ordinate, and increasing values of the reaction rate constant for thermal degradation at 222° C. ($k_{222}$) are measured along the abscissa. The total area of the graph has been divided into four areas by the intersection of two lines, respectively representing a degree of toughness of 1 and a $k_{222}$ of 1%/minute. The formaldehyde polymers of this invention include all compositions found in areas 1, 2, and 3, and exclude all compositions in area 4. The polymers in area 4 have a $k_{222}$ of 1%/minute or greater and have a degree of toughness of less than 1 and are believed to be undesirable for the preparation of films, fibers, and the like. All of the known prior art polymers have a degree of toughness of zero and a $k_{222}$ of greater than 1% per minute, and these polymers therefore lie along the base line (degree of toughness equal to zero) of area 4.

Of areas 1, 2, and 3, area 2 is the most desirable from the standpoint of toughness and thermal stability of the polymer. All polymers in this area have a degree of toughness of 1 or more and also have a $k_{222}$ of less than 1%/minute indicating both an ability to retain toughness and a good thermal stability. Polymers in area 1 have an acceptable thermal stability by having a $k_{222}$ of less than 1%/minute but do not have a degree of toughness of at least 1. Polymers in area 1 are desirable for the manufacture of articles which do not need to retain their original toughness over long periods of time or at high temperatures, but which must be thermally stable, as shown by suffering a minimum of degradation during fabrication. Polymers in area 3, on the other hand, have a degree of toughness of at least 1 and a $k_{222}$ of 1%/minute or more. These polymers are desirable for the preparation of articles which must be able to retain their toughness under the conditions of their ultimate use, even though these polymers may undergo some degradation during fabrication.

Toughness retention, which is referred to in the examples and claims, is determined by subjecting a film of 3 to 7 mils in thickness to a series of manual creasing actions, after the film has been aged by maintaining it at 105° C. for 7 days in a circulating air oven, or its equivalent. The film is removed from the oven and, without further treatment, is subjected to manual creasing actions. A single creasing cycle consists in folding the film through 180° and creasing, and then folding in the reverse direction through 360° and creasing to complete one cycle. The number of creasing cycles which the film withstands before breaking at the crease line is referred to herein as the "degree of toughness." Thus, if a film cannot be creased without breaking, it has a degree of toughness of zero, and if the film breaks on the second cycle, its degree of toughness is one, and so forth. The polymers of this invention must have a degree of toughness of at least one, or else they must have a minimum thermal stability as defined below.

In the description of this invention the property of thermal stability is defined by the value of the reaction rate constant for thermal degradation at 222° C. It is well known that chemical reactions may be classed as first-order, second-order, third-order, etc., depending on the number of molecules which participate in the reaction, and it is also known that the decomposition or degradation of a material following a first-order reaction can be expressed mathematically in the form of the differential equation:

$$\frac{-dw}{dt} = kw$$

in which $t$ is the elapsed time from the beginning of the decomposition reaction, $w$ is the weight of the material which remains undecomposed at time $t$, and $k$ is a rate constant for the equation. The thermal degradation of the formaldehyde polymers of this invention has been found, with few exceptions, to conform closely to the above equation for a first-order reaction. The value of $k$ in this equation is utilized in the description of this invention to characterize a polymer with respect to its thermal stability. When $k$ has a value greater than 1% per minute, it is believed that such polymers are too unstable thermally to be of practical value to the modern fabricator, if such an instability is combined with a degree of toughness of less than 1.

The value of the reaction rate constant for thermal degradation at 222° C. ($k_{222}$), as reported herein, is determined by placing about 1 gram of the polymer to be tested in a small ampule open to the atmosphere through a single capillary tip. The ampule is evacuated, filled with nitrogen, and then evacuated a second time and filled with nitrogen a second time. The ampule is then suspended from a balance in a vapor bath at 222° C. The vapor, in all examples herein, has been obtained by boiling methyl salicylate and allowing the vapors which are at 222° C. to 223° C. to surround the ampule and maintain it at a constant temperature. As the polymer in the ampule degrades into formaldehyde vapors the weight of the remaining solid polymer is recorded at periodic intervals, beginning at the moment the methyl salicylate vapors reach the top of the ampule. These values are then plotted as the logarithm of the weight or weight percent of undegraded polymer vs. the corresponding time since the beginning of degradation. These plotted values normally define a line which is essentially straight throughout the major portion of the degradation period. The value of the reaction rate constant for thermal degradation, $k$, is 2.303 times the slope of the plotted line, and is reported herein as the slope of the straight line portion of the curve. The units of $k$ are reciprocal minutes if the time, $t$, is in minutes, and therefore a $k$ of 0.01 reciprocal minutes is equivalent to 1% per minute and represents a polymer degradation in which 1% of the polymer weight is being degraded per minute of reaction.

Figure 2 illustrates a typical plot used to determine the reaction rate constant as employed in this invention. As described above, an ampule containing the composition to be tested is heated in a vapor bath at 222° C. As soon as the vapors reach the top of the ampule the recorded time begins. Periodically the ampule is balanced to determine the remaining weight of the undegraded composition, and the elapsed time and corresponding values of the percent of polymer weight which remains undegraded are recorded. These values are plotted on semilogarithm graph paper and a series of straight lines are drawn through the plotted points to produce a curve such as ABEF or ABEG shown in Figure 2. The reaction rate constant is the slope of the BE portion of the curve. In a theoretically perfect first-order reaction the curve ABEF would be a single straight line. However, because of unknown factors the curve representing the thermal degradation of the formaldehyde polymers of this invention is usually two or more connected straight lines, each with a slope different from the adjoining portion of the curve. The first portion of the curve, AB, covers the time required for the first 5–10% of the polymer to degrade. This portion generally degrades at a fast rate. After the degradation of this initial portion of the composition, there is a relatively large amount of the composition (generally from about 90% to about 30% or less of polymer remaining) which normally degrades at a steady rate. This portion of the curve is represented by BE. After the degradation reaches point E, one or more changes in rate may occur which causes the remainder of the degradation to proceed at either a faster rate (as indicated by EG) or a slower rate (as indicated by EF). The value of the reaction rate constant for thermal degradation at 222° C. is 2.303 times the slope of the line BE, representing the central portion of the reaction, after a small initial degradation, AB, and not including the erratic values found near the end of the degradation, EF or EG.

A few polymers of this invention have, for some unexplained reason, exhibited a curved line rather than a straight line in the region of BE in Figure 2. The curve in such cases has been relatively flat, that is, it was a curve of large radius, and the $k_{222}$ has been taken as 2.303 times the slope of the best straight line that could be drawn through the plotted points.

Curve BE represents a $k_{222}$ of 1%/minute. Curve BC represents a $k_{222}$ of 0.1%/minute. Curve BD represents a $k_{222}$ of 5.0%/minute. Curve BH represents a $k_{222}$ of 0.5%/minute. The compositions of this invention which have a good thermal stability may be represented by curves having shallower slopes than BE on Figure 2, or, stated in other words, have a $k_{222}$ of less than 1%/minute. The preferred compositions are those represented by curves similar to BH, or in other words, have a $k_{222}$ of about 0.5%/minute or less, and particularly those which are represented by curve BC, having a $k_{222}$ of about 0.1%/minute or less.

The examples which follow are given to illustrate, more specifically, the preferred embodiments of this invention and in these examples, parts are by weight, unless otherwise stated and inherent viscosities refer to viscosities of 0.5% solutions of the formaldehyde polymer at 60° C. in p-chloro-phenol containing 2% by weight of alpha-pinene. In some cases, where it has been specifically described, inherent viscosities have been measured at 150° C. on solutions of 0.5 gram of polymer and 1 gram diphenylamine in 100 ml. of dimethylformamide. The formula for inherent viscosity is that reported by L. H. Cragg in Jour. of Colloid, Science 1, 261–9 (May 1946) and is expressed as follows:

$$\text{Inherent viscosity} = \frac{ln \text{ relative viscosity}}{C}$$

where, relative viscosity=ratio of solution viscosity to solvent viscosity, and $C$=concentration of solute in solution (grams of polymer/100 ml. solution). Inherent viscosities measured in p-chlorophenol have a value of approximately twice the value obtained by measurement in dimethylformamide, through the general range of inherent viscosities reported in the following examples.

*Example 1.*—Sixty-nine parts of alpha-polyoxymethylene was pyrolyzed over a period of 100 minutes and the monomeric formaldehyde which formed was continuously swept at atmospheric pressure with a slow stream of nitrogen through two traps held at −15° C., then into the top of a reaction chamber held at −30° C. and containing a rapidly agitated mixture of 523 parts of decahydronaphthalene and 5 parts of a nonionic dispersing agent made by completely esterifying a polyethylene glycol having a molecular weight of 400 with oleic acid (Kessler Chemical Company, Philadelphia, Pa.). Polymer started to form as soon as the formaldehyde entered the reaction chamber, and continued to form throughout the reaction period. The resultant thick slurry was stirred an additional 30 minutes at −30° C. The system was filtered with suction, the product washed with ether, and air- and vacuum-dried to give 60 parts (87% of the theoretical amount) of snow-white, granular, formaldehyde polymer with an inherent viscosity of 1.66, measured in p-chlorophenol. This polymer formed tough, translucent films by compression molding at 190° C.

*Example 2.*—The procedure of Example 1 was repeated using 100 parts of alpha-polyoxymethylene and 698 parts of decahydronaphthalene containing 2 parts of the nonionic dispersing agent of Example 1, with the alteration that the monomeric formaldehyde was first condensed on a cold finger in the entrance to the reaction chamber, causing liquid formaldehyde to be dropped into the relatively slowly stirred (600 R. P. M.) polymerization medium. Polymerization occurred continuously, forming a mobile slurry in the polymerization medium. The polymer was isolated by simply pouring the system onto a suction filter, washing with ether, and air- and vacuum-drying. Fifty-two parts (52% of theory) of snow-white, granular, formaldehyde polymer was obtained which exhibited an inherent viscosity of 2.11, measured in p-chlorophenol. Tough, translucent films were formed under pressure at 190°–210° C.

*Example 3.*—One hundred parts of alpha-polyoxymethylene was pyrolyzed over a period of 3 hours at atmospheric pressure to form monomeric formaldehyde gas which was continuously swept away with a slow stream of nitrogen through 2 traps held at −15° C. and into the top of a reaction chamber, where the formaldehyde gas came in contact with a rapidly stirred mixture of 468 parts of propane and 4 parts of the nonionic dispersing agent of Example 1. The reaction temperature was maintained at approximately −40° C. by refluxing propane. The boiling propane also served to keep the system additionally agitated and thus afforded efficient contact with the incoming formaldehyde gas. The system was permitted to reflux for an additional hour and the product which had formed continuously was isolated by pouring the system into an open vessel at room temperature and permitting the propane to volatilize. The product was washed with ether to remove dispersing agent and air- and vacuum-dried. The 56 parts (56% of theory) of snow-white, granular formaldehyde polymer obtained had an inherent viscosity of 1.94, measured in p-chlorophenol, and was compression-molded into tough, translucent films at 180°–200° C.

*Example 4.*—Fifty-one parts of alpha-polyoxymethylene was converted into monomeric formaldehyde by pyrolysis at atmospheric pressure over a 1.5 hour period. The monomeric formaldehyde vapors were swept continuously away from the pyrolysis zone by a slow stream of nitrogen, through 2 traps held at −15° C., and then into the top of a reaction vessel where the gas came in contact with a rapidly agitated mixture of 376 parts of n-pentane and 5 parts of the nonionic dispersing agent of Example 1, the system being maintained at −30° C. with a cooling bath. Although polymer formed as the formaldehyde was introduced the system was stirred for an additional half-hour at −30° C. The reactor was discharged onto a suction filter and the polymer was washed on the filter with ether, then air- and vacuum-dried. There was obtained 39.6 parts (78% of theory) of snow-white, granular, formaldehyde polymer with an inherent viscosity of 1.69, measured in p-chlorophenol, from which tough, translucent films were formed by pressing at 180°–200° C.

When 4 parts of silicone oil, having a flash point of 600° F. and a specific gravity of 0.9653, were used with 100 parts of formaldehyde and 501 parts of pentane as in Example 4, the product obtained was similar to that of Example 4. The inherent viscosity of the polymer was 1.36, measured in p-chlorophenol, and tough, translucent films were obtained by compression-molding at 190° C.

*Example 5.*—The formaldehyde gas from pyrolysis of 100 parts of alpha-polyoxymethylene was passed through 12 traps at −30° C. and 250 mm. pressure into the top of a reaction chamber maintained at −50° C. and containing 528 parts of decahydronaphthalene. The mixture in the reaction chamber was stirred continuously with a mechanical stirrer. Polymer formed continuously and tended to collect on the walls of the reactor and as a crust on top of the liquid. The fibrous, white polymer which formed was separated by filtration and, after washing with ether, followed by air drying and vacuum drying, amounted to 35.5 parts (35.5% of theory). The inherent viscosity, measured in p-chlorophenol, of the polymer was 5.72. It was compression-molded into tough, translucent films at 190°–210° C., which exhibited a degree of toughness greater than 100.

Similar results (inherent viscosity of 4.89 at 0.2% concentration in p-chlorophenol) were obtained when the monomeric formaldehyde was passed through 12 traps at −40° C. and 125 mm. pressure onto freezing decahydronaphthalene cooled by a Dry-Ice/acetone bath.

*Example 6.*—One hundred parts of alpha-polyoxymethylene was pyrolyzed at atmospheric pressure to produce monomeric formaldehyde vapors which were then passed through two −15° C. traps and into a reactor containing a vigorously agitated liquid maintained at 50° C. and consisting of 880 parts of decahydronaphthalene and 3 parts of the nonionic dispersing agent of Example 1. Polymer formed continuously over the 3.75 hour pyrolysis period. The fluid slurry which formed was discharged onto a suction filter and the snow-white granular formaldehyde polymer obtained was washed with ether and then air- and vacuum-dried. There was obtained 58 parts of snow-white, granular, formaldehyde polymer having an inherent viscosity of 2.57, measured in p-chlorophenol, and which yielded tough, translucent films when pressed at 180°–190° C.

*Example 7.*—One hundred parts of alpha-polyoxymethylene was pyrolyzed at atmospheric pressure over a period of 3.5 hours. The monomeric formaldehyde vapors were swept away from the pyrolysis zone continuously by a slow stream of nitrogen through two traps held at −15° C. and then into the top of a reactor where the gas came into contact with a rapidly agitated mixture of 704 parts of decahydronaphthalene and 3 parts of the nonionic dispersing agent of Example 1, the system being maintained at 25° C. with a water bath. Although the polymer had formed spontaneously, the system was stirred for an additional hour at 25° C. The reactor was discharged onto a suction filter and the granular polymer was washed on the filter with ether and then air- and vacuum-dried. There was obtained 38 parts (38% of theory) of snow-white, granular formaldehyde polymer having an inherent viscosity of 1.6, measured in p-chlorophenol. Tough, translucent films were obtained when the polymer was pressed at 180°–185° C.

*Example 8.*—One hundred parts of alpha-polyoxymethylene was pyrolyzed in the manner described in Example 1. The monomeric formaldehyde vapors from the pyrolysis zone were passed through two traps maintained at −15° C., and thence into a rapidly agitated mixture of 626 parts of pentane and 0.12 part of tri-n-butylamine held at 25° C. Over a period of four hours, there was obtained 12 parts of a snow-white, granular formaldehyde polymer having an inherent viscosity of 2.2, measured in p-chlorophenol. Tough, translucent 3 to 7 mils thick films were pressed from the above product at 190°–240° C., and 2000 p. s. i. pressure. These films exhibited a degree of toughness of more than 100. Another portion of this polymer was tested and found to have a reaction rate constant for thermal degradation at 222° C. of 0.9% by weight per minute.

*Example 9.*—Monomeric formaldehyde was generated by pyrolyzing 42.4 grams of alpha-polyoxymethylene, the formaldehyde being purified by passing it through a U-tube trap maintained at −15°C. Pyrolysis vapors were passed through the trap and vented to the atmosphere for 15 minutes, after which time the vapors leaving the trap were passed into the polymerization reactor. The reactor contained 800 cc. of a petroleum fraction, consisting predominantly of octanes and boiling between 212° and 284°F., and 1 gram of octadecyldimethylamine containing about 25% dimethylhexylamine as an impurity. The purified pyrolysis vapors were passed into the reactor for 1 hour, during which time 34 grams of alpha-polyoxymethylene were pyrolyzed. The reaction medium was vigorously agitated by mechanical means. The temperature increased during the polymerization from 25°C. to 45°C. After the one-hour period the reaction medium was filtered and the product dried. There was obtained 22.0 grams of powdery, white polymeric formaldehyde having an inherent viscosity of 3.4, measured in p-chlorophenol. The product was pressed at 200°C. and 10,000 pounds ram pressure to give tough, white films having a degree of toughness of more than 100. A portion of this polymer was tested and found to have a reaction rate constant for thermal degradation at 222°C. of 0.67% by weight per minute.

*Example 10.*—Monomeric formaldehyde was generated by pyrolyzing 100 parts of alpha-polyoxymethylene which had been treated before pyrolysis by covering the alpha-polyoxymethylene with pentane followed by distilling off the pentane. The pyrolysis vapors were passed through two U-tubes maintained at −15°C. and thence into the polymerization reactor. A small amount of polymer was formed in these U-tubes during the passage of monomer through the tubes. The reactor contained 880 parts of dry benzene, 0.2 part of tri-n-butylamine and 0.1 part of diphenylamine. The monomer was introduced into the reactor, maintained at 25°C., over a period of 2.5 hours. The reaction medium was stirred rapidly throughout the reaction time. Polymer formed continuously during this period in the form of small particles dispersed in the reaction medium. The dispersion was filtered and there was recovered therefrom 62 parts of a snow-white, high molecular weight formaldehyde polymer having an inherent viscosity of 1.36, measured in p-chlorophenol. A film was formed by pressing some of the polymer at 190°C. and a ram pressure of 1500 lbs. for one minute. The film was tough, translucent, homogeneous and exhibited a degree of toughness in excess of 100. A portion of this polymer was tested for thermal stability and was found to have a reaction rate constant, $k_{222}$, of 0.77% by weight per minute.

A smooth filament was prepared from the above polymer by melt spinning at 190°C. After being hot drawn six times at 160°C., the 80 denier filament obtained exhibited an average tenacity of 4 g./denier at an elongation of 11% and a flexural modulus (a measure of stiffness) of 52 g./denier.

*Example 11.*—Substantially anhydrous monomeric formaldehyde was passed through a series of three U-tubes maintained at −15°C. and then passed in series through two scrubbers containing cyclohexane at room temperature. Following the above pretreatment, the monomeric formaldehyde was passed into a polymerization reactor containing 956 parts of dry cyclohexane, 0.16 part of tri-n-butylamine, and 0.1 part of diphenylamine. The reactor was maintained at 25°C. during the 1.6 hour period in which monomeric formaldehyde was continuously passed into the cyclohexane reaction medium and polymer was continuously formed. The fluid slurry which formed was filtered to recover 25 parts of a finely divided snow-white polymeric formaldehyde having an inherent viscosity of 2.87, measured in p-chlorophenol. This polymer was molded at 190°C. and 1500 lbs. ram pressure for one minute to produce a tough, translucent film which exhibited a degree of toughness greater than 100. A portion of this polymer was tested and found to have a reaction rate constant for thermal degradation at 222°C. of 0.83% by weight per minute, which changed to 0.42% per minute after the first 15% of the polymer had degraded.

*Example 12.*—One hundred parts of anyhydrous monomeric formaldehyde was passed over a period of two hours in series through three U-tubes held at −15°C., through two traps containing cyclohexane at room temperature, and into a reactor in which 780 parts cyclohexane, 0.1 part diphenylamine, and 0.1 part of N, N-dimethyl-p-aminoazobenzene were being rapidly agitated at 25°C. Polymerization occurred as the formaldehyde was introduced and during the two-hour reaction period a total of 41 parts of polymer was collected. This polymer exhibited an inherent viscosity of 3.4, measured in p-chlorophenol, and gave tough, translucent films when compression molded for one minute at 190°–250°C, under 1500 lbs. pressure. These films exhibited a degree of toughness greater than 100. A portion of this polymer was tested and found to have a reaction rate constant for thermal degradation at 222°C. of 1.91% by weight per minute.

*Example 13.*—Thirty-three parts of anhydrous monomeric formaldehyde was passed through three U-tubes at −15°C. and through two traps containing cyclohexane at room temperature, then into a reactor in which 780 parts of cyclohexane, 0.1 part diphenylamine, and 0.09 part N, N-diethylaminoethanol were being stirred rapidly at 25°C. Over a period of 40 minutes of formaldehyde addition, 28 parts of snow-white, high molecular weight formaldehyde polymer formed which exhibited an inherent viscosity of 1.32, measured in p-chlorophenol, and from which tough, translucent films were compression molded in one minute at 190°C. under 1500 lbs. pressure. This film exhibited a degree of toughness greater than 100. The reaction rate constant for thermal degradation of this polymer at 222°C. was found to be 0.84% by weight per minute.

*Example 14.*—One hundred parts of alpha-polyoxymethylene was pyrolyzed under 125 mm. absolute pressure over a period of three hours to produce monomeric gaseous formaldehyde which was passed through 12 U-tubes held at −40°C., and then into a reactor in which 468 parts of propionitrile was being stirred at −80°C. Polymer formed continuously as the monomeric formaldehyde contacted the propionitrile. The slurry was filtered, washed with ether, and air- and vacuum-dried to give 35 parts of snow-white formaldehyde polymer of inherent viscosity 1.5, measured in p-chlorophenol. A tough, translucent film was compression molded in one minute at 190°C. under 1500 lbs. pressure.

*Example 15.*—Seventy-five parts of alpha-polyoxymethylene was pyrolyzed over a two hour period to produce monomeric gaseous formaldehyde which was passed through two traps at −15°C., and then into a reactor in which 800 parts of carbon tetrachloride, 0.05 part diphenylamine, and 0.078 part tri-n-butylamine were rapidly agitated and maintained at 25°C. Polymerization proceeded throughout the addition of the monomeric formaldehyde. The resulting slurry was filtered, washed with ether, and air-dried to give 25.6 parts of snow-white, high molecular weight formaldehyde polymer. This polymer exhibited an inherent viscosity of 1.75, measured in p-chlorophenol. A tough, translucent film was compression molded in one minute at 190°C. under 1500 lbs. pressure. This film exhibited a degree of toughness of more than 100. A portion of this polymer was found to have a reaction rate constant for thermal degradation at 222°C. of 0.67% by weight per minute.

*Example 16.*—Monomeric formaldehyde was generated by pyrolyzing 100 parts of alpha-polyoxymethylene, and passing the pyrolysis vapors through two traps maintained at −15° C. The formaldehyde monomer was continuously passed into an agitated reaction medium maintained at 25° C. and composed of 626 parts of pentane and 0.33 part of octadecyldimethylamine. As rapidly as the monomeric formaldehyde was introduced into the reaction medium over a 4.1 hour period, the formaldehyde polymerized to form a fluid slurry. The slurry was filtered and the polymer washed with ether, and air- and vacuum-dried to produce 28.5 parts of a snow-white, granular, high molecular weight polymeric formaldehyde having an inherent viscosity of 2.0, measured in p-chlorophenol. A portion of this polymer was pressed at 190°–230° C. into a film, 3 to 4 mils in thickness, which exhibited a degree of toughness greater than 1. This polymer was found to have a reaction rate constant for thermal degradation of 222° C. of 0.67% by weight per minute.

*Example 17.*—Monomeric formaldehyde, generated by the pyrolysis of 100 parts of alpha-polyoxymethylene, was passed through two traps maintained at −15° C., and into a reaction medium composed of 630 parts of pentane, and 0.1 part of octadecylamine. The monomeric formaldehyde was continuously introduced over a period of 4 hours into the reaction medium which was rapidly agitated at a temperature of 25° C. Polymer formed in the reaction medium continuously during that time. After filtering, washing, and drying, there was obtained 13 parts of polymeric formaldehyde having an inherent viscosity of 1.81, measured in p-chlorophenol. Tough, translucent films, 3.5 mils thick, were pressed at 190° C. and 1500 lbs. ram pressure for 1 minute. This film exhibited a degree of toughness in excess of 100.

Essentially the same results were obtained by utilizing the tri-n-heptylamine in place of the octadecylamine in the above example.

*Example 18.*—Monomeric formaldehyde was generated by pyrolyzing cyclohexyl hemiformal and passing the pyrolyzed vapors, at a rate of 1.8 grams per minute, through a series of three U-tubes maintained at 0° C. and packed with ½ inch McMahon packing (a stainless steel screen bent in a form similar to a saddle). The monomer was then passed into a 5-liter 3-necked flask equipped with a stirrer and inlet and exit tubes for the monomer. The flask contained 2.5 liters of dry benzene and 5.65 milligrams of triethyl phosphine, the contents of the flask being maintained at 32° C. While the contents of the flask were stirred vigorously, formaldehyde monomer was introduced over a period of 90 minutes over the surface of the reaction medium and formaldehyde polymer formed continuously during this time as dispersed particles. The polymer was filtered from the reaction medium, washed with cyclohexane and dried at 50° C. in a vacuum oven. The polymer was found to have an inherent viscosity of 1.42 measured in dimethylformamide. (This value of inherent viscosity compares to a value of approximately 2.8 as measured in p-chlorophenol as described above.) The polymer was found to have a reaction rate constant for thermal degradation at 222° C. ($k_{222}$) of 0.71% by weight per minute. A portion of this polymer was molded into a film and found to have a degree of toughness of less than 1 although prior to aging the film was extremely tough.

*Example 19.*—Formaldehyde monomer prepared in the manner as described in Example 18 was passed into a 1 liter flask containing 500 cc. of dry n-heptane which was being stirred vigorously. After sufficient monomer had been admitted to the flask in order to completely fill the vapor space and to saturate the n-heptane thoroughly, there was added 0.5 milligram of morpholine and 5 milligrams of triphenyl phosphine. Polymer began forming immediately and continued to form as additional formaldehyde monomer was passed over the heptane for a period of 15 minutes. During the course of the polymerization the temperature of the agitated n-heptane was maintained at 30° C. The polymer which formed was separated by filtration, washed successively with cyclohexane and methanol, and then dried in a vacuum oven at 60° C. The inherent viscosity of this polymer was found to be 1.12, measured in dimethylformamide. (This value of inherent viscosity compares to a value of approximately 2.2 when measured in p-chlorophenol as described above.) The reaction rate constant for thermal degradation at 222° C. ($k_{222}$) was found to be 0.74% by weight per minute over the first 90 minutes. A film was compression molded at 200° C. and found to be very tough although after aging the film had a degree of toughness of 0.

*Example 20.*—Monomeric formaldehyde, generated by pyrolyzing 100 parts of alpha-polyoxymethylene, was purified by passing it consecutively through two traps held at −15° C. The purified formaldehyde was then passed into a reactor in which 630 parts of pentane and 0.2 part triphenylphosphine were being rapidly agitated at 25° C. Polymerization occurred as rapidly as the formaldehyde was introduced, producing 9 parts of a snow-white, powdery polymer. This polymer exhibited an inherent viscosity of 1.9 measured in p-chlorophenol and gave translucent films when compression molded for one minute at 180–220° C., the films exhibiting a degree of toughness greater than one. This polymer was found to have a reaction rate for thermal degradation at 222° C. of 1.32% by weight per minute.

*Example 21.*—One hundred parts of essentially anhydrous formaldehyde was passed over a period of 2.5 hours through two traps at −15° C. and into a reactor in which a solution of 780 parts of cyclohexane, 0.078 part of tri-n-butylamine, and 0.1 part phenothiazine was being rapidly agitated at 25° C. Snow-white, granular polymer formed throughout the reaction in the total amount of 35.5 parts. This polymer exhibited an inherent viscosity of 2.4 measured in p-chlorophenol and a reaction rate for thermal degradation of 0.42% by weight per minute. A translucent film 4.5 mils thick prepared by compression molding at 190° C. for one minute exhibited a degree of toughness greater than 100.

The foregoing examples have been submitted to illustrate specific preferred embodiments and are not to be construed as limitations of the invention.

It is important that the reaction medium be chemically inert to formaldehyde under the reaction conditions. In general, the media which are most useful from practical and cost considerations are the hydrocarbons, especially hydrocarbons containing from 3 to 10 carbon atoms in the molecule. Included among these compounds are the aliphatic, cycloaliphatic, and aromatic hydrocarbons. Examples of these are propane, butane, pentane, hexane, heptane, octane, decane, cyclopentane, cyclohexane, methylcyclohexane, 1,4-dimethylcyclohexane, cycloheptane, decahydronaphthalene, benzene, toluene, and xylene. Other operable reaction media which are inert to formaldehyde include nitriles, halogenated hydrocarbons, nitro compounds, acetals, ethers, and others which may be apparent to those skilled in the art.

The amount of reaction medium employed during the polymerization is not critical. At lower ratios of the amount of reaction medium used per unit amount of formaldehyde polymerized, the product dispersion may become too thick for economical handling. In general this lower limit is about 1 to 1, or equal weights of reaction medium and formaldehyde polymer. The upper limit is determined primarily by economical and commercial considerations, e. g., the desired thickness of dispersion, the cost of the reaction medium, and the size of equipment. For most embodiments of this invention it is not commercially attractive to employ more than about 100 parts of reaction medium per part of formaldehyde polymer which is formed. The preferred limits of the process of this invention are from about 4 to about 100 parts of reaction medium per part of formaldehyde polymer.

The use of a dispersing agent is often desirable, but it is not necessary, as illustrated in Example V. Useful dispersing agents include both the ionic type and the nonionic type. Examples of such agents are the reaction product of polyethylene glycol with wool wax alcohols; the long chain fatty acid diesters of polyethylene glycols and polypropylene glycols having molecular weights above 200, such as the diesters of decanedioic, dodecanedioic, octadecanedioic, and octadecenedioic acids, etc.; silicone oils having molecular weights in the range of 800 to 1000, reaction products of olefin oxides and long chain fatty acids, alkylarylpolyoxymethylene glycol ethers, reaction products of hydrogenated rosin and olefin oxides, metal salts of long chain fatty acids such as sodium oleate, lead stearate, sodium caprylate, and other similar agents.

The amount of dispersing agent may vary between 0.10 and 10% by weight of the reaction medium. As a rule 0.20 to 3% of dispersing agent will be adequate and such amounts are recommended when it is desirable to employ a dispersing agent.

The polymerization may be carried out over a wide temperature range which may vary from the melting point to the boiling point of the reaction medium, although, as shown in the foregoing examples, it is preferable to maintain the temperature at a substantially constant value throughout any one polymerization reaction. When the preferred reaction media are utilized at about atmospheric pressure, it has been found that good results may be obtained by conducting the polymerization at temperatures from about −110° C. to about 100° C. For most commercial operations where it is desirable to employ atmospheric pressure, the preferred range is from about −50° C. to about 70° C.

Although the use of an added polymerization initiator is not always necessary, under certain conditions of temperature and reaction media, a polymerization initiator may be used to improve the reaction rate and yield of product. Useful initiators are the primary, secondary, and tertiary aliphatic amines, cycloaliphatic amines and primary aromatic amines. Examples of such initiators are methyl, ethyl, butyl, octyl, dodecyl and octadecyl amines, dibutylamine, ethyloctylamine, tributylamine, trihexylamine, dimethyloctadecylamine, didodecylmethylamine, cyclohexyldibutylamine, cyclohexylamine, diethylcyclohexylamine, aniline, toluidine, and the like. Other useful initiators are those disclosed in copending application U. S. Serial No. 365,235, filed by Robert N. MacDonald, on June 30, 1953; namely, arsines, stibines, and phosphines of the general formula:

in which M is arsenic, antimony, or phosphorus and R, $R_1$, and $R_2$ are monovalent hydrocarbon radicals. Examples of such compounds are triphenylphosphine, triethylphosphine, tritolylphosphine, trixylylphosphine, trinaphthylarsine, tributylphosphine, triethylstibine, methyldioctylarsine, and the like. Still other initiators which may be employed in the process of this invention include hydrazine and substituted hydrazines, morpholines and substituted morpholines, piperidines, N-alkylpiperidines, etc. Still another type are the aminoalkanols, e. g., N,N-diethylaminoethanol, etc. In some embodiments of this invention it may be desirable to employ a combination of two or more of these catalytic compounds.

To the dispersions there may be added stabilizers, such as alpha-pinene, and there also may be added antioxidants such as free radical precursors and stable free radicals.

The catalyst is preferably introduced by incorporating it into the reaction medium. If desired, the catalyst may be employed in the form of a solution in which the solvent preferably is the same as the liquid forming the reaction medium. The addition of catalyst may be controlled to maintain the temperature of reaction within the range selected for operation. If catalyst is added to the medium before the formaldehyde is passed into the reaction zone, then the rate of passage of the formaldehyde may be controlled to maintain the temperature within the range selected for operation.

The foregoing examples show continuous introduction of formaldehyde monomer into the reaction zone, and the simultaneous formation of an accumulated polymerization product which is recovered after polymerization has stopped. This method is easily adapted to a completely continuous process by continuously withdrawing the product dispersion and, at the same time, introducing the reactants in a continuous fashion. A semi-continuous operation may be employed, which would entail interrupting the introduction of monomeric formaldehyde into the polymerization zone after the desired amount of polymer has been formed, withdrawing the product, and then starting another polymerization cycle.

The monomeric formaldehyde utilized in the process of this invention is substantially anhydrous. Substantially anhydrous, monomeric formaldehyde obtained from any source can be used in the process of this invention. A convenient way of obtaining substantially anhydrous, monomeric formaldehyde is shown in the foregoing examples, namely, by pyrolysis of alpha-polyoxymethylene, followed by conducting the pyrolysis vapors through a series of U-tubes maintained at temperatures low enough to remove impurities. Alpha-polyoxymethylene may be prepared by treating ordinary methanol-free formaldehyde with aqueous sodium hydroxide, filtering and washing the product which forms, and finally drying the product. Small portions of water and other impurities may be tolerated in the monomeric formaldehyde, for example, up to about 0.5%, the remaining 99.5% or more being monomeric formaldehyde. Better products are generally obtained, however, when the formaldehyde content is at least 99.9%.

The polyoxymethylenes of this invention are distinguished from other heretofore known polyoxymethylenes by either of two features; namely, by having a first-order reaction rate constant for thermal degradation at 222° C. of less than 1% per minute, or by having a degree of toughness of at least 1. Some polymers of this invention meet both of these qualifications and other polymers meet one qualification but not both.

Inherent viscosity is not a critical property of the polymers of this invention since polymers of formaldehyde have been made which have a wide range of inherent viscosities, e. g., from about 0.1 to about 10.0 measured in p-chlorophenol.

Polyoxymethylenes have been made, following the teachings of the prior art, having inherent viscosities ranging from about 0.1 to about 10.0 (measured in p-chlorophenol as previously described) and these polymers have, without exception, failed for one of two reasons: (1) the polymer was so unstable that a film could not be formed under ordinary conditions of heat and pressure because the polymer degraded almost completely, or (2) the polymer could be pressed into a film with the accompaniment of a large amount of degradation, but the film became extremely brittle upon being heated in air at 105° C. for a day or two. Because polymers having a high molecular weight are generally preferred in the fabrication of various articles of manufacture, the preferred polymers of this invention are those having an inherent viscosity in p-chlorophenol of at least 1.0. The polymers having the lower values of inherent viscosity are of particular value where high melt flow characteristics are preferred, such as the spinning of fibers, and the polymers having higher values of inherent viscosity are generally of particular value in molding operations such as the pressing of films and the molding of bulky articles.

For comparative evaluation with polymers made according to the foregoing examples, the methods of Staudinger and Walker have been followed in preparing polymers as follows:

Anhydrous liquid formaldehyde was prepared according to the method described in Walker ("Formaldehyde," by J. F. Walker, ACS Monograph No. 98, Reinhold Publishing Corp., New York, 1944, pp. 24–26). The procedure was modified to the extent that a second distillation step was added so that the liquid monomeric formaldehyde from the decomposition of alkali-precipitated alpha-polyoxymethylene was condensed, distilled to a second receiver, and then redistilled into a third receiver. This final receiver was sealed and kept at −80° C. for polymerization under nitrogen according to the procedure described in Staudinger ("Die Hochmolekularen Organischen Verbindungen, Kautschuk and Cellulose," Springer, Berlin, 1932, p. 282). After 18 hours the material in the reactor was translucent and solid. After 12 days the polymer which had formed was white and opaque. After 18 days the reactor was opened and placed under vacuum for 18 hours at −80° C. to remove residual monomer. While still under vacuum the reactants were allowed to warm to room temperature. During this process there was a momentary evolution of heat, indicating some polymerization of the remaining formaldehyde. The solid polymer was removed from the reactor and was found to have an inherent viscosity of 1.47, measured in p-chlorophenol. A portion was converted to a tough, flexible film of 0.0035 inch in thickness by pressing between aluminum foils at 190° C. for one minute under 2000 lbs. pressure. There was a considerable amount of degradation of the polymer during this fabrication. This film had a degree of toughness of zero. In an attempt to increase the toughness of the film, a narrow strip of this film was stretched lengthwise at room temperature until a permanent elongation of 278% had been imparted. The resulting stretched film was highly oriented along the axis of drawing. A sample of the stretched film lost 5.5% by weight and became brittle after seven days aging in an air oven at 105° C., i. e., it had a degree of toughness of zero at that time.

In another polymerization liquid formaldehyde was obtained as described above except that, when the apparatus had been filled with nitrogen initially, no more nitrogen was injected and the preparation was carried out at 100 mm. pressure. Under these conditions some polymer formed in the system, from which the formaldehyde was distilled and redistilled. The polymer remaining from the distillation was removed from the reactor and found to have an inherent viscosity of 1.58. A film of 0.0025 inch in thickness was prepared as previously described. A narrow strip of film was stretched lengthwise at room temperature until a permanent elongation of 142% had been imparted. The resulting film was highly oriented along the axis of drawing. A sample of this stretched film lost 3.7% in weight and became brittle on aging seven days in an oven at 105° C., the degree of toughness being zero. Unstretched film became brittle quicker than did the stretched film.

In a series of experiments polymers were prepared in the same manner as taught by the prior art, and as described above. These polymers were subjected to the thermal stability test described previously herein and were found to have values of the reaction rate constant for thermal degradation at 222° C. varying from about 6% to 8% per minute.

In contrast to the films made as described above by the methods of the prior art, films prepared in accord with the process of this invention after seven days' aging at 105° C. have a degree of toughness in excess of 100 and/or have an excellent thermal stability as indicated by having a reaction rate constant for thermal degradation of less than 1% per minute, and preferably below 0.5%/minute.

The process of this invention makes it possible to obtain polyoxymethylenes which yield tough, clear, sheets, moldings, funicular structures such as fibers, filaments, and bristles, films and other articles commonly made with synthetic resins.

The compositions of this invention may include other substances in addition to formaldehyde polymer. Such substances include pigments, fillers, plasticizers, stabilizers, and other compatible substances.

I claim:

1. A normally solid, synthetic, high molecular weight polyoxymethylene selected from the group consisting of (1) polyoxymethylenes having a degree of toughness of at least 1, said degree of toughness of at least 1 being determined by the consecutive steps of compression- molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and (2) polyoxymethylenes, failing to exhibit a degree of toughness of at least 1, but having a reaction rate constant for thermal degradation at 222° C. of less than 1% by weight per minute, measured by thermally degrading said polyoxymethylene in a vessel open to the atmosphere.

2. A polyoxymethylene described in claim 1 which has an inherent viscosity of at least 1.0, said inherent viscosity being measured at 60° C. on a 0.5% solution of said polyoxymethylene in p-chlorophenol containing 2% by weight of alpha-pinene.

3. A film comprising a polyoxymethylene of claim 1.

4. A funicular structure comprising a polyoxymethylene of claim 1.

5. A normally solid, synthetic, high molecular weight polyoxymethylene having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line.

6. A normally solid, synthetic, high molecular weight polyoxymethylene having a reaction rate constant for thermal degradation at 222° C. of less than 1% by weight per minute, measured by thermally degrading said polyoxymethylene in a vessel open to the atmosphere.

7. A normally solid, synthetic, high molecular weight polyoxymethylene having a reaction rate constant for thermal degradation at 222° C. of less than 0.5% by weight per minute, measured by thermally degrading said polyoxymethylene in a vessel open to the atmosphere.

8. A process for preparing a high molecular weight polyoxymethylene consisting essentially of the steps of passing a continuous stream, consisting essentially of monomeric formaldehyde in a concentration of at least 99.5% formaldehyde, into contact with a polymerization reaction medium consisting essentially of (1) a liquid hydrocarbon having 3 to 10 carbon atoms per molecule and being selected from the group consisting of aliphatic hydrocarbons, cycloaliphatic hydrocarbons, and aromatic hydrocarbons, and (2) a catalytic amount of a compound from the group consisting of primary, secondary and tertiary aliphatic amines, primary, secondary and tertiary cycloaliphatic amines, and primary aromatic amines; continuously agitating said reaction medium at a temperature from about −50° C. to about +70° C. at substantially atmospheric pressure; continuing the passing of said monomeric formaldehyde into the agitated reaction medium as polymeric particles are forming therein; maintaining the reaction temperature at a substantially constant value from about −50° C. to about +70° C. throughout the polymerization reaction; and recovering particles of a high molecular weight polyoxymethylene.

9. A process for preparing high molecular weight polyoxymethylene consisting essentially of the steps of passing a continuous stream, consisting essentially of monomeric formaldehyde vapors in a concentration of at least 99.9% formaldehyde, into a polymerization reaction medium consisting essentially of (1) a liquid hydrocarbon having 3 to 10 carbon atoms per molecule, and being selected from the group consisting of aliphatic hydrocarbons, cycloaliphatic hydrocarbons, and aromatic hydrocarbons, and (2) a catalytic amount of a compound from the group consisting of primary, secondary, and tertiary aliphatic amines, primary, secondary, and tertiary cycloaliphatic amines, and primary aromatic amines; continuously agitating said reaction medium at a substantially constant temperature from about −50° C. to about +70° C. and at substantially atmospheric pressure; continuing the passing of said monomeric formaldehyde into the agitated reaction medium as polyoxymethylene particles are forming therein; and recovering a dispersion of high molecular weight polyoxymethylene particles in said reaction medium.

10. A process for preparing a high molecular weight polyoxymethylene consisting essentially of the sequential steps of continuosuly purifying aqueous formaldehyde to produce a continuous vapor stream containing at least 99.9% by weight formaldehyde; continuously passing said vapor stream into contact with a polymerization reaction medium consisting essentially of (1) a liquid hydrocarbon having 3 to 10 carbon atoms per molecule, and being selected from the group consisting of aliphatic hydrocarbons, cycloaliphatic hydrocarbons, and aromatic hydrocarbons, and (2) a catalytic amount of a compound from the group consisting of primary, secondary, and tertiary aliphatic amines, primary, secondary, and tertiary cycloaliphatic amines, and primary aromatic amines; continuously agitating said reaction medium at a substantially constant temperature from about −50° C. to about +70° C. and at substantially atmospheric pressure; continuing the passing of said monomeric formaldehyde into the agitated reaction medium as polyoxymethylene particles are forming therein; and recovering a dispersion of high molecular weight polyoxymethylene particles in said reaction medium.

11. A process for preparing a high molecular weight polyoxymethylene consisting essentially of the sequential steps of pyrolyzing a low molecular weight, thermally degradable polyoxymethylene; continuously passing the pyrolysis vapors thus produced through a series of cold traps maintained at about −15° C.; continuously discharging the vapors from said traps into the vapor space in a polymerization reactor containing an agitated liquid reaction medium consisting essentially of (1) 4 to 100 parts, per part of said high molecular weight polyoxymethylene of a liquid hydrocarbon having 3 to 10 carbon atoms per molecule and being selected from the group consisting of aliphatic hydrocarbons, cycloaliphatic hydrocarbons, and aromatic hydrocarbons, and (2) a catalytic amount of an aliphatic amine; said reaction medium being continuously agitated while being maintained at a temperature of +25° C. to +30° C. and at atmospheric pressure; continuing the discharging of purified monomeric formaldehyde vapors into said reactor as high molecular weight polyoxymethylene particles form in said reaction medium; and recovering a dispersion of particles of high molecular weight polyoxymethylene.

References Cited in the file of this patent

UNITED STATES PATENTS

| 2,296,249 | Austin et al. | Sept. 22, 1942 |
| 2,304,431 | Walker | Dec. 8, 1942 |
| 2,593,862 | Eichmeyer | Apr. 22, 1952 |

OTHER REFERENCES

Ellis: The Chemistry of Synethetic Resins, vol. I, 1935, page 512.

Walker: Jour. Amer. Chem. Soc., vol. 55, July 1933, pages 2821–2822.

Auerbach et al.: Arbeiten-Reichs-Gesundheitsamte, vol. 27, 1907–1908, page 226.

Walker: Formaldehyde, Reinhold, 2nd ed., 1953, pages 163–166.

Walker: Formaldehyde, 1st ed., Reinhold, 1944, pages 65, 67, 91–94, 101.

Staudinger: Die Hochmolekularen Organischen Verbindugen, Springer 1932 (Photolithoprint, Edwards, 1943), pp. 257–263, 280–287.

Cragg: J. of Colloid Science, vol. 1, No. 3, May 1946, pp. 261 and 266.

Dedication 2,768,994.—*Robert Neal MacDonald*, Wilmington, Del. POLYOXYMETHYLENES.
Patent dated Oct. 30, 1956. Dedication filed July 30, 1963, by the assignee, *E. I. du Pont de Nemours and Company*.
Hereby dedicates said Letters Patent to the people of the United States.
[*Official Gazette October 29, 1963.*]